United States Patent [19]
Darboven

[11] 3,721,977
[45] March 20, 1973

[54] IMAGE BEAM LOCK-ON DETECTOR

[75] Inventor: Ernest F. Darboven, Katonah, N.Y.

[73] Assignee: The Singer Company, Little Falls, N.J.

[22] Filed: Aug. 26, 1971

[21] Appl. No.: 175,269

[52] U.S. Cl. .........................343/7 A, 343/5 R, 343/8
[51] Int. Cl. ................................................G01s 9/48
[58] Field of Search .....................343/5 R, 7 A, 8, 9

[56] References Cited

UNITED STATES PATENTS

| | | | |
|---|---|---|---|
| 3,491,333 | 1/1970 | Goulet et al. | 343/7 A |
| 3,513,471 | 5/1970 | Mooney et al. | 343/8 |

*Primary Examiner*—Stephen C. Bentley
*Attorney*—S. A. Giarratana et al.

[57] ABSTRACT

In an airborne doppler velocity sensor employing a fixed antenna with selectable multiple beams, a system is provided for detecting when a frequency tracking loop has locked onto signals from an unsuppressed image beam corresponding to a non-selected beam. An automatic gain control (AGC) signal is provided representative of the relative power levels of frequency signals in each beam tracked by the loop. The AGC signal is continuously fed to a module which maintains a reference voltage at a value indicative of the maximum power being received from all of the beams. If the difference between the reference voltage and a signal representing the minimum value of the AGC signal exceeds a threshold set by a comparator, a "no-go" signal is produced warning that the tracking loop has locked onto a spurious signal and velocity computations are therefore unreliable.

13 Claims, 7 Drawing Figures

INVENTOR
ERNEST F. DARBOVEN

INVENTOR
ERNEST F. DARBOVEN

IMAGE BEAM LOCK-ON DETECTOR

BACKGROUND OF THE INVENTION

The invention relates generally to the field of antenna systems, and more particularly to improvements in signal processing for a doppler-type navigational velocity sensor having a fixed antenna with switchable multiple beams.

One way in which an aircraft's ground speed may be determined is by transmitting a narrow beam of radio frequency energy, usually microwave, aimed obliquely at the ground. The detected difference in frequency between the transmitted signal and received signals reflected back to the aircraft from the ground is proportional to the airplane's velocity in the direction of the beam due to the well-known Doppler effect. Knowing the orientation of the beam, an operator or computer can use simple trigonometry to derive the desired heading and drift (perpendicular to heading) velocities.

In current doppler velocity systems several beams are obliquely aimed forward and backward at the earth with respect to the aircraft's heading. By subtracting the doppler frequencies in a pair of fore and aft beams, for example, certain benefits are obtained including relative freedom from pitch and vertical errors as well as error produced by changes in transmitter frequency. A more detailed explanation of the desirability of using multiple fore and aft beams is found in U.S. Pat. No. 2,981,944 to Washburne.

There are several ways of producing multiple beams. A plurality of antennas could be used in an array, or a single antenna having switchable main lobes could be employed. An example of the latter type of antenna is disclosed in the co-pending application Ser. No. 171,900 filed Aug. 16, 1971 for "Leaky Waveguide Planar Array Antenna" by Leonard Schwartz et al., assigned to the assignee of this application.

One of the inherent features of multibeam single antennas is that when one beam is chosen, other beams are not fully suppressed. Perfect lobe switching is not practical due to the high cost of absolute impedaence matching and other factors. The spurious beams are termed image beams since they coincide with lobes that could be selected. Compared to the power of the energy received in the selected beam, the image beam power is very low. Nevertheless, the beams can be confused with each other if one of the image beams is aimed at a far better incidence angle to the earth than the main beam is.

In the past, this problem was solved my mechanically gimbolling the antenna so as to keep its orientation with the ground constant despite pitch and roll of the aircraft during turning, ascending or descending maneuvers. But the mechanical device was unreasonably costly, complicated and heavy.

With a single antenna rigidly fixed to the underside of the aircraft, image and main beam confusion was unavoidable. The output of an attitude indicator could have been used to warn of the possibility of beam confusion, but this technique was found to indicate to many false alarms over land. Other unsatisfactory approaches involving systematic comparisons of the computed velocites among various beams or with an external standard, such as an inertial guidance velocity computation were either burdensome on the operator or unreliable for certain speeds and attitudes.

SUMMARY OF THE INVENTION

The applicant has discovered that a special relationship between image and main or selected beams can be used to solve the problem of beam confusion. Image beams, due to their low relative power, are only troublesome during infrequent changes in aircraft attitude. At these times a frequency tracking loop, receiving the doppler frequencies may mistakenly lock onto the center frequency in the image beam, which would make the velocity computations inaccurate. Instead of attacking the problem of image beam suppression, the applicant has provided a means of detecting when false lock-on has occurred. In a system where several beams are selected in a repeating sequence, assume that number 2 beam, for example, is an offending image beam when number 1 beam is selected. If number 2, as an image beam, is locked onto in mistaken preference over number 1, then it will certainly be correctly locked onto when it (number 2) is selected as main beam. For a given single beam there is a known power difference between its reception as a main beam or an image beam termed "inherent image beam rejection." This main and image beam power differential, typically 28 db, may be determined by known test techniques. To utilize the beam power differential, a system is provided which feeds an automatic gain control signal, indicative of beam power, to a module which maintains a reference voltage at a value representing the maximum power among all the received beams. If the difference between the reference voltage and a signal indicative of the minimum value of the AGC signal is equal to or exceeds a threshold set by a comparator circuit, representing the inherent image beam rejection, a no-go signal is produced warning that the tracking loop has locked onto an image beam by mistake and that the velocity computed therefrom is erroneous. One of the distinct advantages of this system is that a no-go signal is produced only when false lock-on has actually occurred. Moreover, a uniquely direct and uncomplicated circuit is provided for implementing the system.

DESCRIPTION OF THE PREFERRED EMBODIMENT

Figure 1:
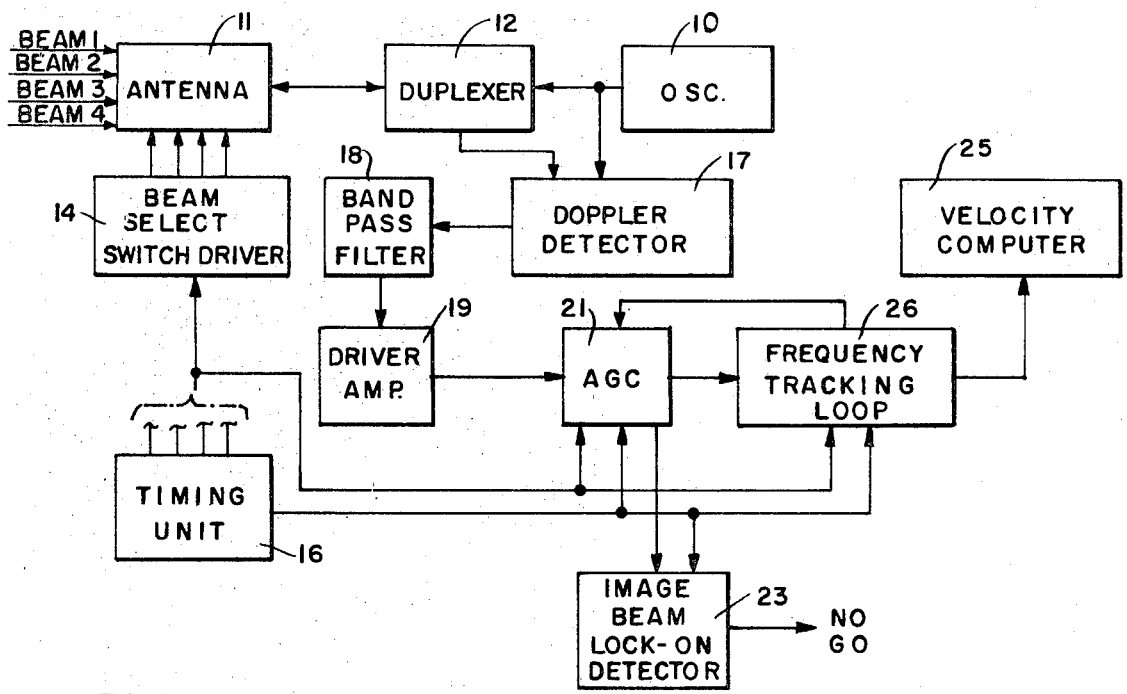
FIG. 1 is a block diagram of a doppler velocity system having an image beam lock-on detector according to the invention.

Referring to the drawings, the basic doppler velocity sensor in FIG. 1 includes a microwave oscillator 10 producing a CW output, typically 13 Gigahertz, which is passed to an antenna 11 via a duplexer 12. Antenna 11 comprises a single fixed antenna capable of projecting and receiving energy in several thin beams aimed obliquely at the earth's surface. The antenna described in the above-mentioned co-pending application is preferred although other switched beam antennas may be employed. Antenna 11 is shown producing four separate beams. A typical four beam pattern for determining aircraft heading and drift velocities is shown in U.S. Pat. No. 3,150,375 to Bevan et al. which uses one pair of forward beams aimed downwardly to the left and right of the airplane's forward heading and a second pair of aft beams similarly oriented. Microwave energy fed to antenna 11 from oscillator 10 is sequentially distributed to beams 1, 2, 3, and 4 by a beam select switch driver 14 which continuously recycles the four beams at about 7.5 Hertz by means of a sequence and timing unit 16. As the beams are switched, reflected microwave energy is also received by antenna 11 and passed via duplexer 12 to a doppler shift detector 17 which extracts the doppler frequency shift by comparison with the reference output of oscillator 10. Those familiar with the principles of doppler radar will recognize that the output of detector 17 is zero when there is no relative velocity between antenna 11 and the surface from which one of the beams is reflected. If, however, the aircraft is flying at a particular velocity, the output of detector 17 will contain a doppler shift frequency spectrum related to the velocity component of the aircraft in the direction of each beam. The output of detector 17 is passed via a suitable band pass filter 18 and driver amplifier 19 to an automatic gain control (AGC) 21 which holds the doppler signals at a constant average voltage for each beam regardless of fluctuations in the returned power. Since noise and ground clutter are ordinarily included in the reflected signal and since the beam strikes the ground in an area instead of a point, the shift frequency attributable to aircraft velocity is identified as the peak power or center frequency in the spectrum for each beam in succession.

Figure 2:
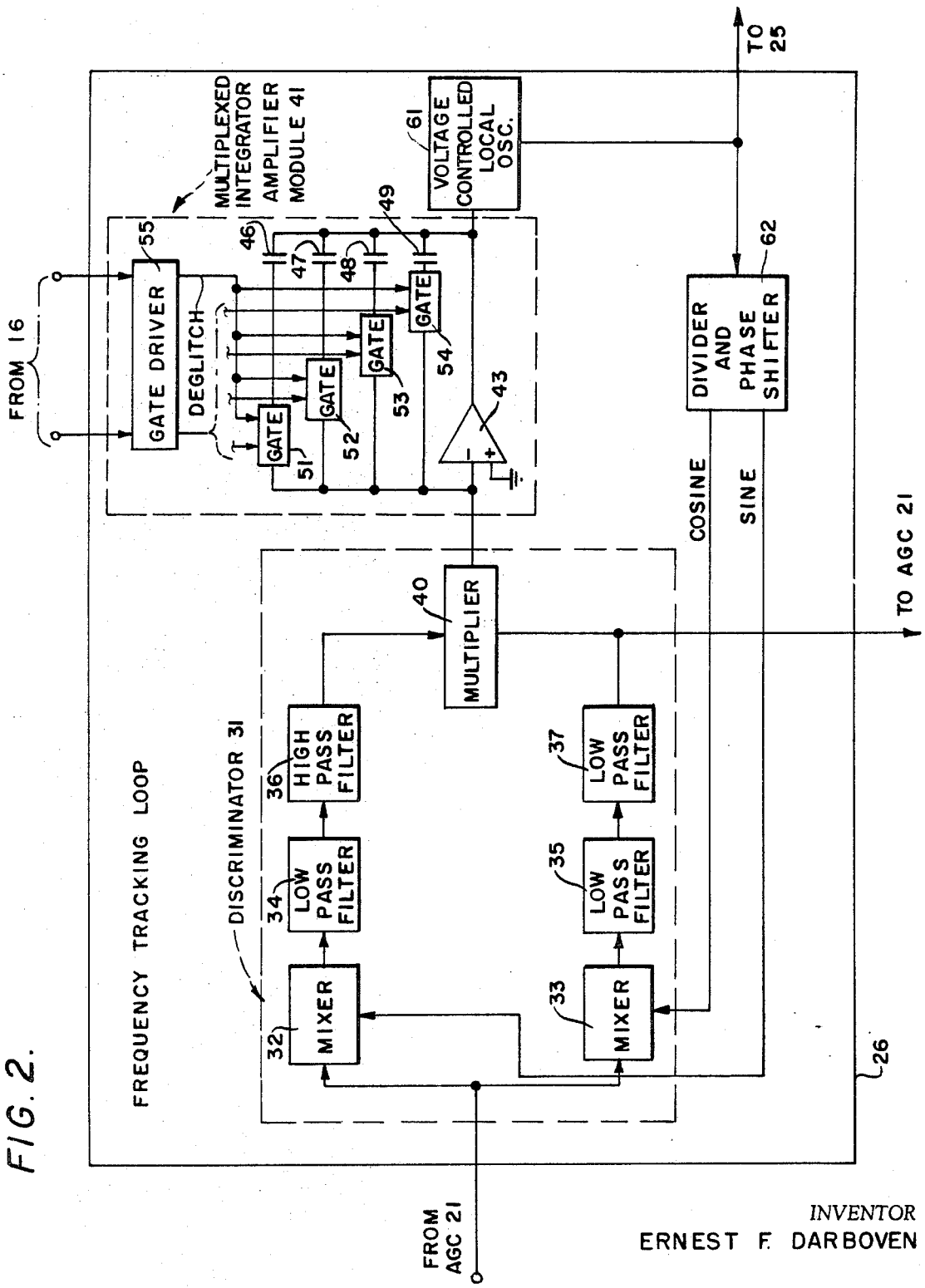
FIG. 2 is a block and schematic diagram of the frequency tracking loop in the system of FIG. 1.

Referring now to FIG. 2, loop 26 has three essential components: a voltage-controlled local oscillator 61 whose frequency is controlled by the output voltage of a multiplexed integrator module 41 responsive to the output of a discriminator 31. Each doppler spectrum is compared by discriminator 31 with the frequency of local oscillator 61 received via a divider and phase shifter unit 62 which provides the sine and cosine to discriminator 31 at, for example, one-fourth the frequency produced by oscillator 61. Because of the noise-like character of the doppler return, the DC output of discriminator 31 cannot be directly applied to control the frequency of oscillator 61 but must first be entered into integrator module 41 to assure a smooth continuous control signal and to provide high static accuracy.

The function of loop 26 is to maintain local oscillator 61 at a frequency which is proportional to the center frequency in the doppler spectra from AGC 21. The output of local oscillator 61 is therefore proportional to the velocity component in the direction of a given beam. The output of oscillator 28 may be used in a velocity computer 41 to generate analog or digital signals representative of the aircraft's heading and drift velocities by adding and subtracting the doppler frequencies associated with beams 1, 2, 3, and 4. The mathematical relationship between these velocities and the doppler returns from oblique forward and aft beams has long been understood. The details of a suitable computer to perform these calculations are adequately shown in U.S. Pat. No. 2,981,944 to Washburne.

The elements of discriminator 31 form a balanced demodulator comprising a pair of sine and cosine mixers 32 and 33 operatively receiving the output of local oscillator 61 in quadrature. Both mixers 32 and 33 receive the same sequential doppler signals from AGC 21. The sum and difference of these signals and the sine and cosine oscillator outputs of mixers 32 and 33, 90° out of phase, are passed through respective low pass filters 34 and 35 to select the difference signals among the mixer outputs. Next, the sine output of filter 34 is passed through a high pass filter 36 and the output of filter 35 through a low pass filter 37 to shift the signals 90° back into phase with each other. The in-phase difference signals are then fed to a multiplier 40 producing a DC output which is proportional to the difference between the divided output of local oscillator 61 and the peak power frequency of the doppler input signal to discriminator 31. The multiplier output is positive when the oscillator output of unit 62 is greater than the doppler input signal, and negative if it is less (the sine of a negative angle is negative, while the cosine remains positive). The polarity of the error signals is such as to drive oscillator 61 in the right direction to reduce the error signal.

Multiplexed integrator module 41 comprises a single high-gain DC operational amplifier 43 receiving the error signal from discriminator 31. Four capacitors, 46, 47, 48, and 49, corresponding respectively to beams 1 through 4 (FIG. 1), are coupled separately in parallel between the input and output of amplifier 43 to enable module 41 to follow the progress of the doppler center frequency in the respective beams. A set of gates 51, 52, 53, and 54, disposed in the paths of capacitors 46 through 49, accomplishes the necessary switching. The four-line array timing signal from timing unit 16 (FIG. 1) is connected via a gate driver 55 to synchronize the sequential operation of gates 51 through 54 with the beam switching of array 11. To prevent two capacitors from being accidentally interconnected at any given time permitting unwanted transfer of charge, gates 50 through 54 are simultaneously disabled by a separate line from timing unit 16 via gate driver 55 which briefly opens the gates during the switching transition from one beam to the next. The disabling pulses may be generated by timing unit 16 as a function of the four-line switching output.

When beam 1 is selected, all of the discriminator error signal will be fed to capacitor 46. The voltage output of amplifier 43 will reflect integration of the DC error signal from discriminator 31 corresponding to beam 1. When timing unit 16 signals the end of the beam 1 period and the beginning of the beam 2 period, gate 51 is opened, and since there is now no discharge path for capacitor 46, it will retain the charge which it accumulated or "integrated" during the beam 1 period by removing and storing the voltage from the output of amplifier 43 which controls oscillator 61. After passing through similar periods for beams 2, 3 and 4, the period for receipt of energy in beam 1 recurs and further accumulation of charge by capacitor 46 takes place, assuming that an error signal from discriminator 31 is still present. Of course, if local oscillator 61 has already been slewed to the correct frequency, there will be no error signal during the beam 1 period. A more detailed description of the operation of tracking loop 26 is found in the co-pending application Ser. No. 159,861 filed July 6, 1971, for "Frequency Tracking Loop" by E. F. Darboven et al. and assigned to the assignee of this application.

The doppler input signals for the mixers in discriminator 31 are from AGC 21 which comprises an AGC detector 22 providing a rectified output to an integrator amplifier network 24 which drives an attenuator 27 to control the level of the doppler signals in each beam return. AGC detector 22 takes its input from the output of low pass filter 37 in the cosine section of discriminator 31 (FIG. 2). The input to AGC detector 22, which is still AC, is "detected" or rectified therein to utilize the average amplitude to drive integrator network 24. Because the input is from the filtered cosine mixer output of discriminator 31, AGC unit 21 is responsive to the level of the center frequency being tracked by loop 26 rather than being dependent on the average amplitude across the whole doppler input spectra of each beam. This fact is utilized for image beam lock-on detection since the output of AGC detector 22 will at times represent the relative signal level of the discrete center frequency of an image beam. If the input to detector 22 were only from the unmixed doppler signals, the output of detector 22 would represent the average level of image and main beams combined. Those skilled in the art of automatic gain control will recognize that the unmixed doppler signal may be added to the discriminator output to AGC detector 22 to insure an AGC input at temporary intervals when loop 26 is not yet completely locked onto a signal, for example, during high acceleration of the aircraft when the center frequency is rapidly changing.

The output of AGC detector 22 is passed to the negative input of a DC operational amplifier 65 having a grounded positive input. Across the output and negative input of amplifier 65, a set of four capacitors, 67, 68, 69, and 70, are connected in parallel. To selectively connect and disconnect the capacitors with amplifier 65, corresponding gates 72, 73, 74, and 75 are connected in series respectively with each capacitor. The capacitor gates are opened and closed in a repeating sequence by pulses from timing unit 16 via a gate driver 66 to synchronize the loop response with the beam switching, just as the capacitors in integrator module 41. For example, when the period for beam 1 doppler energy occurs, the attenuation will be switched to the value it attained at the end of the preceding beam 1 period because capacitor 67 will have "memorized" the amplifier output at that point.

Figure 3:
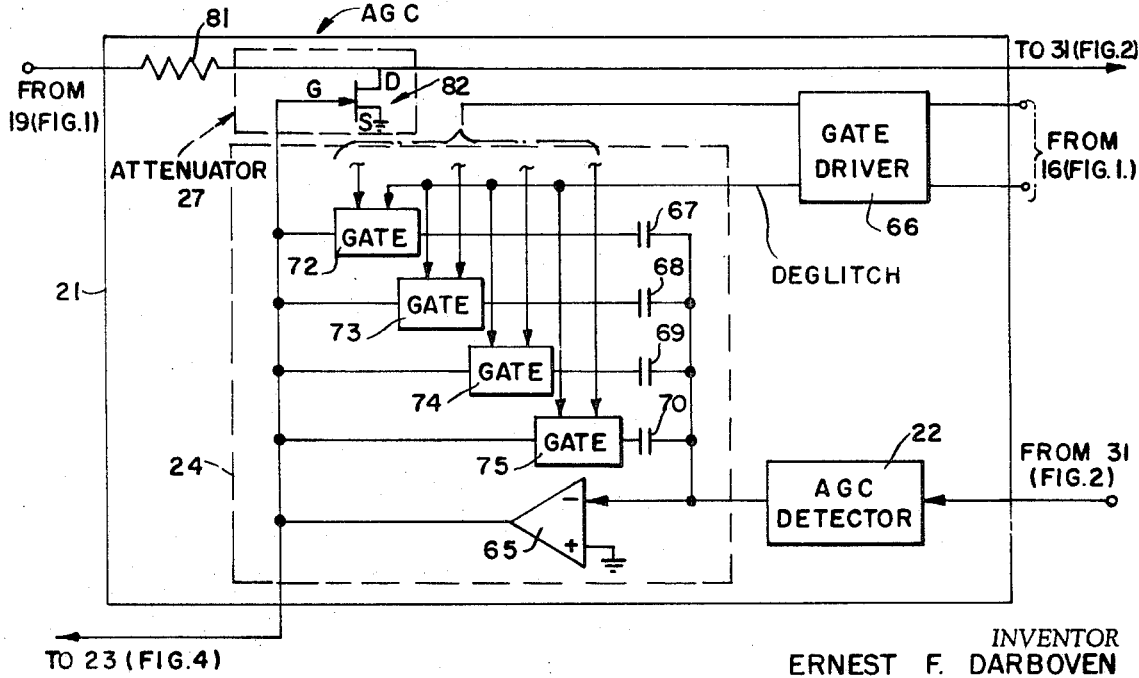
FIG. 3 is a block and schematic diagram of the AGC unit of FIG. 1.

The output from driver amplifier 19 is passed through AGC 21 via a resistor 81 (FIG. 3). The doppler output is selectively attenuated by grounding out a varying portion of the signal through field effect transistor (FET) 82 whose drain lead D is tapped into the doppler line. The source lead S is grounded, and the gate input G is connected to the output of amplifier 65. When the tracked doppler signal is small the gate voltage will be negative and the drain to source resistance, $R_{DS}$, large, providing little attenuation. When the signal (output of amplifier 65) is large, however, the gate voltage will approach zero and $R_{DS}$ will diminish passing a larger share of the signal to ground.

Figure 4:
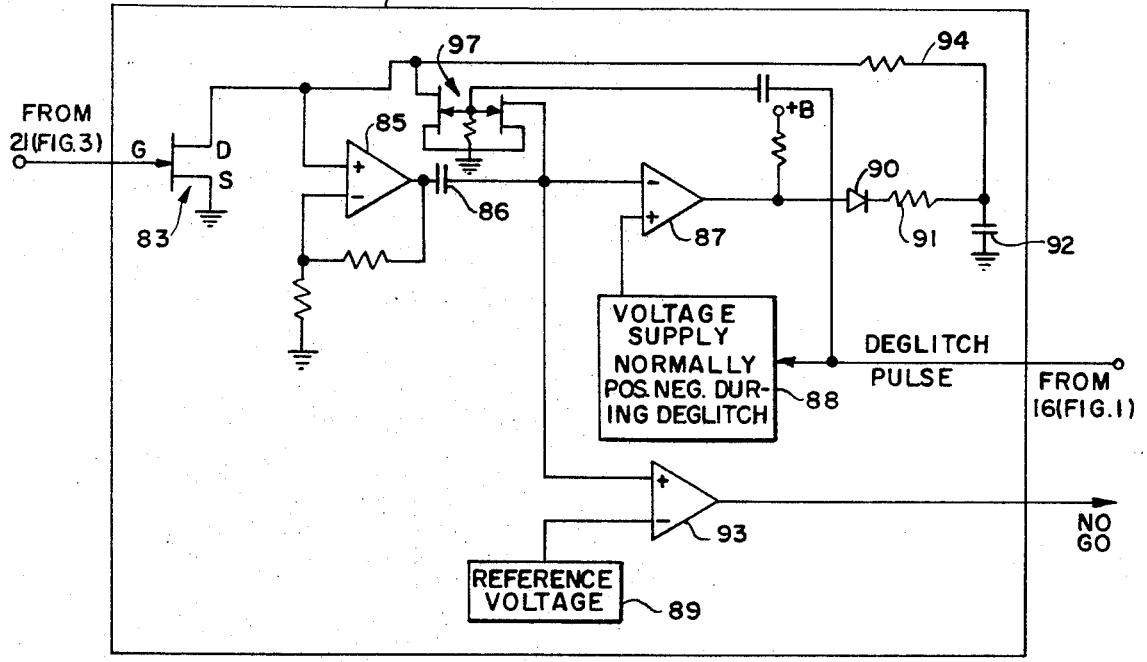
FIG. 4 is a block and schematic diagram of the lock-on detector of FIG. 1.

The image beam lock-on detector 23, as shown in detail in FIG. 4, has an FET gate 83 similar to that in AGC 21 (FIG. 3). $R_{DS}$ for gate 83 is controlled similarly by the output of amplifier 65. FET gates 82 and 83 may suitably comprise a commercially available matched dual J FET unit. Unlike FET 82, the drain lead D for FET 83 is connected to the positive input of an operational amplifier 85 having suitable biasing. The amplified output is passed via a decoupling capacitor 86 to the negative input of a differential amplifier 87 whose positive input is normally held at a positive reference voltage. The output of amplifier 87, biased by a source of positive voltage, is passed to a diode 90 which blocks the flow of current unless it is forward-biased by a positive output from amplifier 87. An integrating RC network is formed by a resistor 91 and a grounded capacitor 92 in parallel, resistor 91 being connected to the other side of diode 90. The voltage at the junction of capacitor 92 and resistor 91 is passed via feedback resistor 94 to the input of amplifier 85 (Drain lead D of FET 83) to complete a feedback loop.

The negative input of differential amplifier 87 forms the positive input to another differential amplifier 93, whose negative input is held at a reference voltage representing the threshold beam power differential which exists for a false lock onto an image beam. The output of amplifier 93, when positive, indicates image beam lock-on. The circuitry of detector 23 is deglitched during beam switching in an analogous manner to that used in the integrator amplifiers for AGC 21 and integrator module 41. The gate leads of a pair of FET's 97 are connected to the deglitch pulse line from timing unit 16. FET 97 grounds the feedback loop and the negative input to amplifier 87 when the deglitch pulse occurs. The positive input of amplifier 87 must be made slightly negative when the negative input is grounded to avoid spurious charging of capacitor 92.

Figure 5:
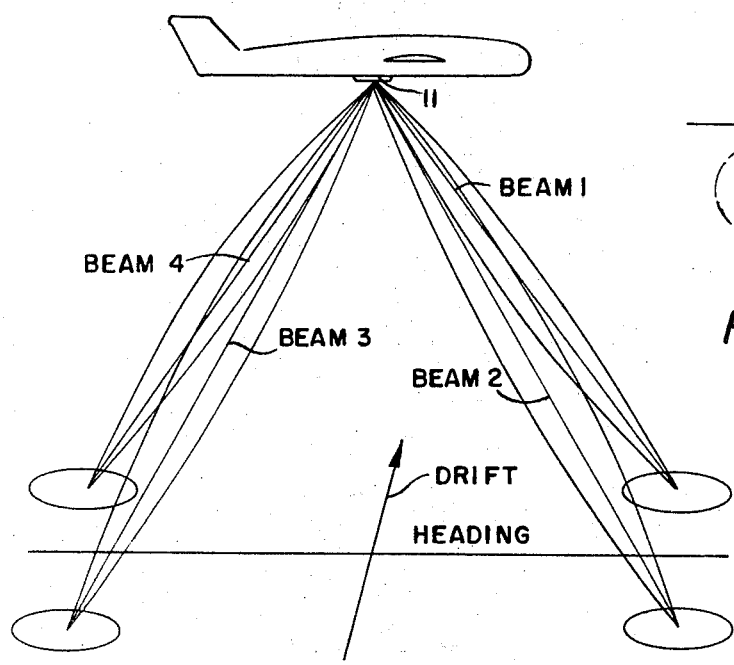
FIG. 5 is a schematic representation of a typical beam pattern produced by the antenna of FIG. 1.
Figure 6:
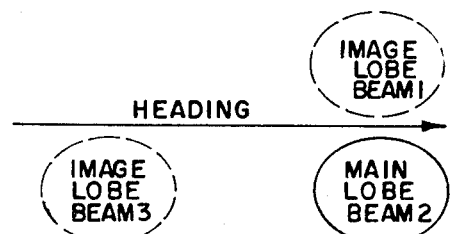
FIG. 6 is a schematic representation of a typical location of image beams for the pattern of FIG. 5.

To better understand the operation of image beam lock-on detector 23, it is helpful to consider a specific example. FIG. 5 illustrates typical orientations of beams 1, 2, 3, and 4 relative to the earth. The beams in which energy is both received and transmitted are constantly being switched in a repeated sequence as the plane moves along its course. Referring to FIG. 6, for any given main lobe (selected beam) the two adjacent beams will produce images. Thus for selected beam 2, the image beams are 1 and 3. For beam 3, the image beams would be 4 and 2.

Figure 7:
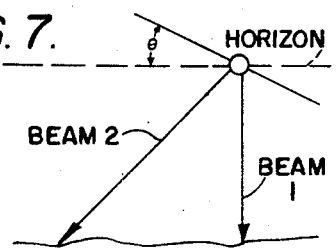
FIG. 7 is a schematic representation illustrating a typical circumstance in which image beam lock-on would occur.

In FIG. 7 an aircraft, viewed front the front, is shown executing a roll of $\theta°$ relative to the horizon. Beam 1 now has an incidence angle to the earth much closer to normal or perpendicular than beam 2 does. When, as in FIG. 6, beam 2 is selected, there is a strong possibility that the signal in image beam 1 will be t racked by loop 26 (FIG. 2), especially if the airplane is over water where incidence angles become more critical.

Ordinarily, such mistaken tracking would go undetected unless the computer velocity was intuitively unreasonable. However, image beam lock-on detector 23 is instrumented to indicate false lock-on by way of a no-go signal which will disable the computer input or alert the operator to the malfunction at the precise time when it occurs.

Referring to FIG. 4, assume that capacitor 92 is completely discharged and the AGC control signals (sequential output of amplifier 65 FIG. 3) are at some constant level producing corresponding voltage drops, according to $R_{DC}$, across FET 83. As long as the negative input of differential amplifier 87 is less than the normal voltage of the positive input, the difference will be a positive voltage causing diode 90 to pass current to charge capacitor 92. The voltage or charge on capacitor 92 is fed back to the drain lead of FET 83 and summed with the voltage at that point to form the negative input to amplifier 87. Assume that one of the beams produces a signal higher than the others. FET 83 acts as an inverter causing the negative input to amplifier 87 to decrease allowing more charge to pass to capacitor 92. The feedback loop inherently seeks to equalize the inputs to amplifier 87, but only for the maximum returns because of diode 90. Therefore, when the loop is tracking the maximum AGC signal, the charge on capacitor 92 will reflect the maximum value of the returns in all the beam periods.

At this point, if an image beam is mistakenly tracked during one of the beam periods due to aircraft attitude, one of the beam returns will be much lower than the maximum return occurring in the same cycle for another beam period. A low AGC voltage (output of amplifier 65) results, increasing $R_{DS}$ for the corresponding beam period. The negative input is immediately raised above the positive reference since before the low return the input plus capacitor voltage equaled the positive voltage input to amplifier 87. But the negative output of amplifier 87 is blocked by diode 90 so that capacitor 92 does not discharge. The negative input of amplifier 87 during the low image return is thus $V_{cap} + V'_{max}$, where $V_{cap}$ is the capacitor voltage representing the maximum return and $V'_{max}$ represents the inverted minimum AGC input to FET 83. After normal operation of the system, $V_{cap}$ is equal to $V_{ref} - V'_{min}$, where $V_{ref}$ is the positive reference voltage input to amplifier 87 and $V'_{min}$ represents the inverted maximum AGC input to FET 83. Amplifier 93 compares $V_{cap} + V'_{max}$ with another reference voltage (positive input), $V_{diff}$, representing the inherent beam power differential or image beam rejection factor. When $V_{cap} + V'_{max}$ is greater than or equal to $V_{diff}$ it follows that $V_{ref} - V'_{min} + V'_{max} \geq V_{diff}$ or $V'_{max} - V'_{min} \geq V_{diff} - V_{ref}$. $V_{diff}$ is chosen so that $V_{diff} - V_{ref}$ represents a 28 db differential, for example, in accordance with the known inherent beam power differential of the antenna. When the positive input to amplifier 93 exceeds the negative input, $V_{diff}$, a no-go signal is produced indicating a temporary system malfunction.

Those skilled in the art will understand that other arrangements besides the circuit of FIG. 4 may be used to detect the power differential between the maximum and minimum return. Other types of antennas producing multiple beams can also be utilized so long as the image beam return is at the position of one of the selectable main lobes so that the beam power differential is in a suitable range for detection.

The advantages of the invention lie in the fact that the system has inherent simplicity and only indicates the no-go condition when image lock-on exists. Moreover, there are no aircraft speed limitations as in some of the prior art methods. Another unique advantage is that the system will detect when two image beams are locked onto for two corresponding main beam periods, for example, beams 2 and 3 tracking the images of beams 1 and 4 respectively. Ordinarily, this type of error would not be detectable in the computed velocity outputs.

It will be understood that various changes in the details, materials, steps and arrangements of parts, which have been herein described and illustrated in order to explain the nature of this invention, may be made by those skilled in the art within the principle and scope of the invention as expressed in the appended claims.

What is claimed is:

1. In a radar system including oscillator means producing a transmitting signal, antenna means coupled to the oscillator means for providing a plurality of individually selectable beams aimed in different directions for transmission and receipt of energy, an unsuppressed image beam corresponding to one of the beams being present when another beam is selected, and tracking means coupled to the antenna means for locking onto the peak power frequency in the received energy for each selected beam to provide an output replica thereof, a method of detecting whether the tracking means is incorrectly locked onto the peak power frequency in the received energy of an unsuppressed image beam instead of a selected beam, comprising the steps of determining the maximum and minimum signal levels received by all of the selected beams, comparing the maximum level to the minimum level to obtain a beam signal level difference signal, and generating an alarm when the difference signal exceeds a predetermined level.

2. The method of claim 1 wherein the predetermined level represents the inherent image beam rejection of the antenna means.

3. A multi-beam doppler radar system of the type comprising a transmit-receive antenna adapted to be unmovably mounted on an aircraft providing a plurality of individually selectable beams aimed in different directions, a timing unit connected to the antenna to select the beams one at a time in a repeating sequence, an unsuppressed image beam of one of the beams being present when another beam is selected, an oscillator providing the antenna with a transmitting signal, a doppler shift detector coupled to the antenna and operatively receiving the transmitting signal for extracting doppler signal spectra received in each beam, and frequency tracking means connected to receive the output of the doppler shift detector for locking onto the peak power frequency in the spectra and providing an output replica thereof, wherein the improvement comprises:

beam power differential detector means operatively connected to said tracking means for determining the maximum and minimum levels of the peak power doppler signals returned in all of the beams and providing an output indicative of the difference between said maximum and minimum levels; and comparator means connected to receive the differential detector means output for providing an alarm signal when said detector means output exceeds a predetermined threshold indicative of lock onto an image beam by said tracking means.

4. The system of claim 3 wherein the improvement further comprises the tracking means providing an output signal indicative of the power of the signal beam tracked, said differential detector means including differential amplifier means having a first input connected to a source of reference voltage and a second input inverter means responsive to said power output of said tracking means for providing an output signal to said differential amplifier second input inversely proportional to said power output, a capacitive element operatively connected to receive the output of said amplifier for accumulating charge therefrom, diode means connected between said amplifier output and said capacitive element permitting current to flow to said capacitive element only when said reference voltage exceeds the voltage on said second input, and a feedback loop operatively connecting said capacitive element with the second input of said amplifier, said differential detector means difference output being provided by said second input of said amplifier.

5. The system of claim 4 wherein the improvement further comprises AGC means connected to receive said power signal from said tracking means and providing a control output to said inverter means.

6. The system of claim 5 wherein the improvement further comprises said AGC means including an AGC detector connected to receive said tracking means power output and multiplexed integrator means receiving the AGC detector output for providing said AGC means control output.

7. The system of claim 6 wherein the improvement further comprises said multiplexed integrator means including an AGC amplifier having an input connected to receive said AGC detector output, a plurality of capacitive elements corresponding respectively to the antenna beams, and a switching network responsive to the timing unit for connecting selected ones of said capacitive elements in parallel across the output and said input of said AGC amplifier, said AGC amplifier output providing the control output.

8. The system of claim 7 wherein the improvement further comprises said AGC means further including an attenuator responsive to said AGC amplifier output and connected to said doppler shift detector output for passing to said tracking means the shift detector output attenuated in accordance with said AGC amplifier output.

9. The system of claim 8 wherein the improvement further comprises said comparator means including threshold detector means receiving said difference output from said differential detector means and having a reference voltage for providing said alarm output signal when said reference voltage is exceeded by said difference output.

10. The system of claim 9 wherein the improvement further comprises said inverter means including transistor means having a gate input coupled to receive said tracking means power signal and a pair of terminals one of which is grounded and the other connected to said second input of said differential amplifier.

11. The system of claim 10 wherein the improvement further comprises said attenuator including a transistor element having a gate input and a pair of terminals, said gate input being connected to receive said AGC amplifier output, one of said terminals being coupled to ground and the other being connected to said doppler shift detector output to ground out a variable portion thereof.

12. The system of claim 11 wherein the improvement further comprises said attenuator transistor element and said beam power differential detector transistor element being matched field effect transistors.

13. The system of claim 12 wherein the improvement further comprises means connected to said differential amplifier to inhibit the output thereof during beam switching responsive to the timing unit.

* * * * *